United States Patent [19]

Oshikiri

[11] 4,036,569
[45] July 19, 1977

[54] FULL-AUTOMATIC PANNING SYSTEM FOR WHITE BREAD PRODUCTION LINE

[75] Inventor: Tatsuo Oshikiri, Tokyo, Japan

[73] Assignee: Kabushiki Kaisha Oshikiri Kikai Seisaku-Sho, Tokyo, Japan

[21] Appl. No.: 662,437

[22] Filed: Mar. 1, 1976

[30] Foreign Application Priority Data

| Mar. 6, 1975 | Japan | 50-27483 |
| Mar. 6, 1975 | Japan | 50-27484 |
| Mar. 6, 1975 | Japan | 50-27485 |
| Mar. 24, 1972 | Japan | 47-29552 |
| Mar. 24, 1972 | Japan | 47-34809[U] |

[51] Int. Cl.² ............................................. A21C 9/08
[52] U.S. Cl. .................................... 425/140; 425/135; 425/337; 425/397
[58] Field of Search ............... 425/135, 140, 145, 392, 425/397, 337

[56] References Cited

U.S. PATENT DOCUMENTS

| 1,609,865 | 12/1926 | Dellenbarger | 425/337 X |
| 2,337,526 | 12/1943 | Steadman et al. | 425/135 |
| 2,843,062 | 7/1958 | Kieffaber | 425/135 X |
| 3,085,519 | 4/1963 | Engels et al. | 425/140 |
| 3,605,646 | 9/1971 | Jolly et al. | 425/397 X |

*Primary Examiner*—Francis S. Husar
*Assistant Examiner*—William R. Briggs
*Attorney, Agent, or Firm*—George B. Oujevolk

[57] ABSTRACT

A panning system for a full-automatic white bread production line is composed of a cylindrical dough piece selector which detects cylindrical dough pieces in a molder which are transferred one by one intermittently and selects and removes the cylindrical dough pieces longer than a predetermined length or making a narrow pitch with a preceeding cylindrical dough piece; a centering machine which transfers the selected cylindrical dough pieces, and detects lateral deviations in the column of the detected dough pieces to correct them by the deviating amount; a bending machine which bends the cylindrical dough pieces transferred them into the determined shapes; and, a circular table panning machine for receiving the bent dough pieces one by one and moving them successively to charge simultaneously a plurality of the dough pieces into a bread pan.

21 Claims, 27 Drawing Figures

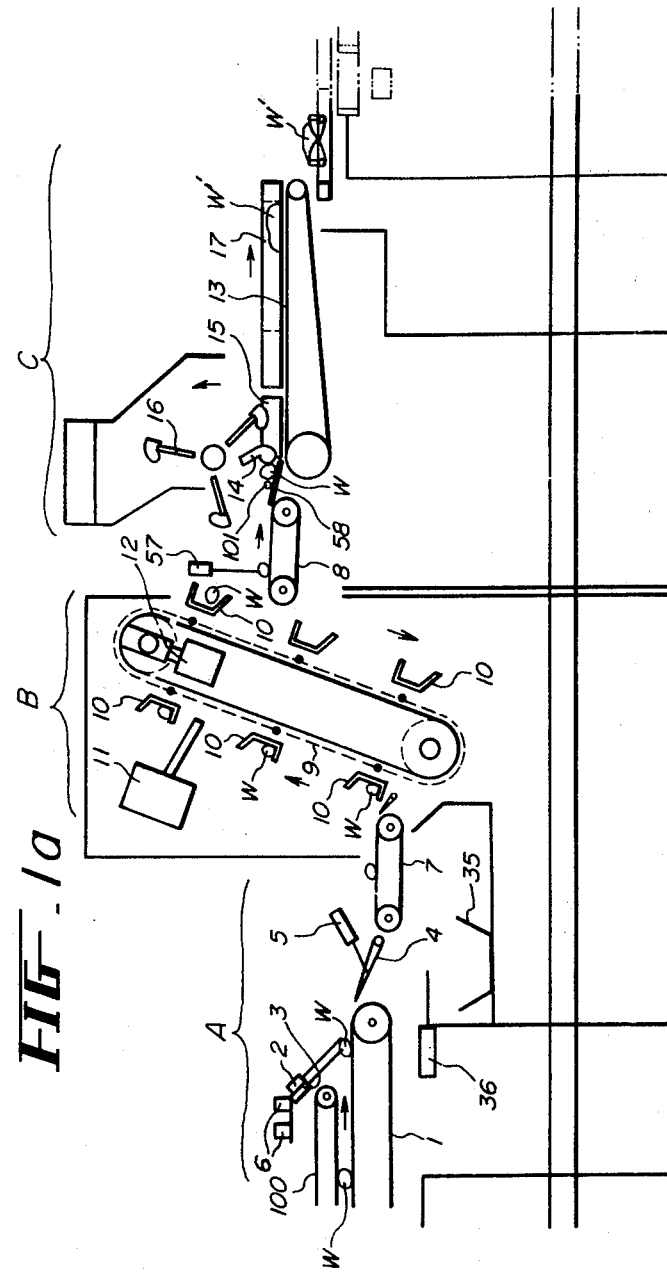

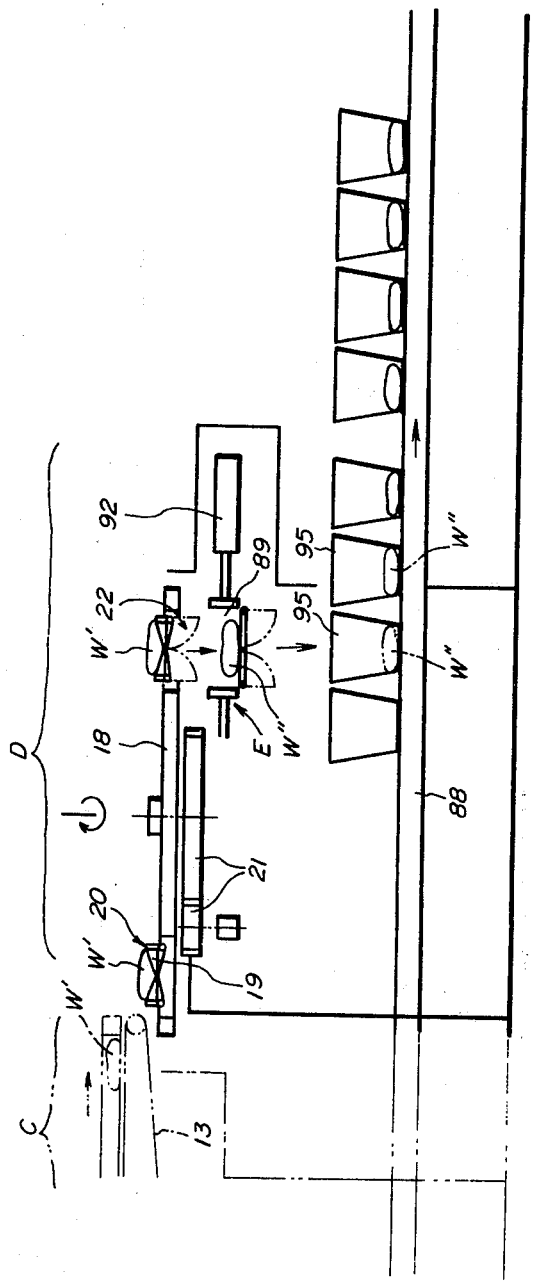

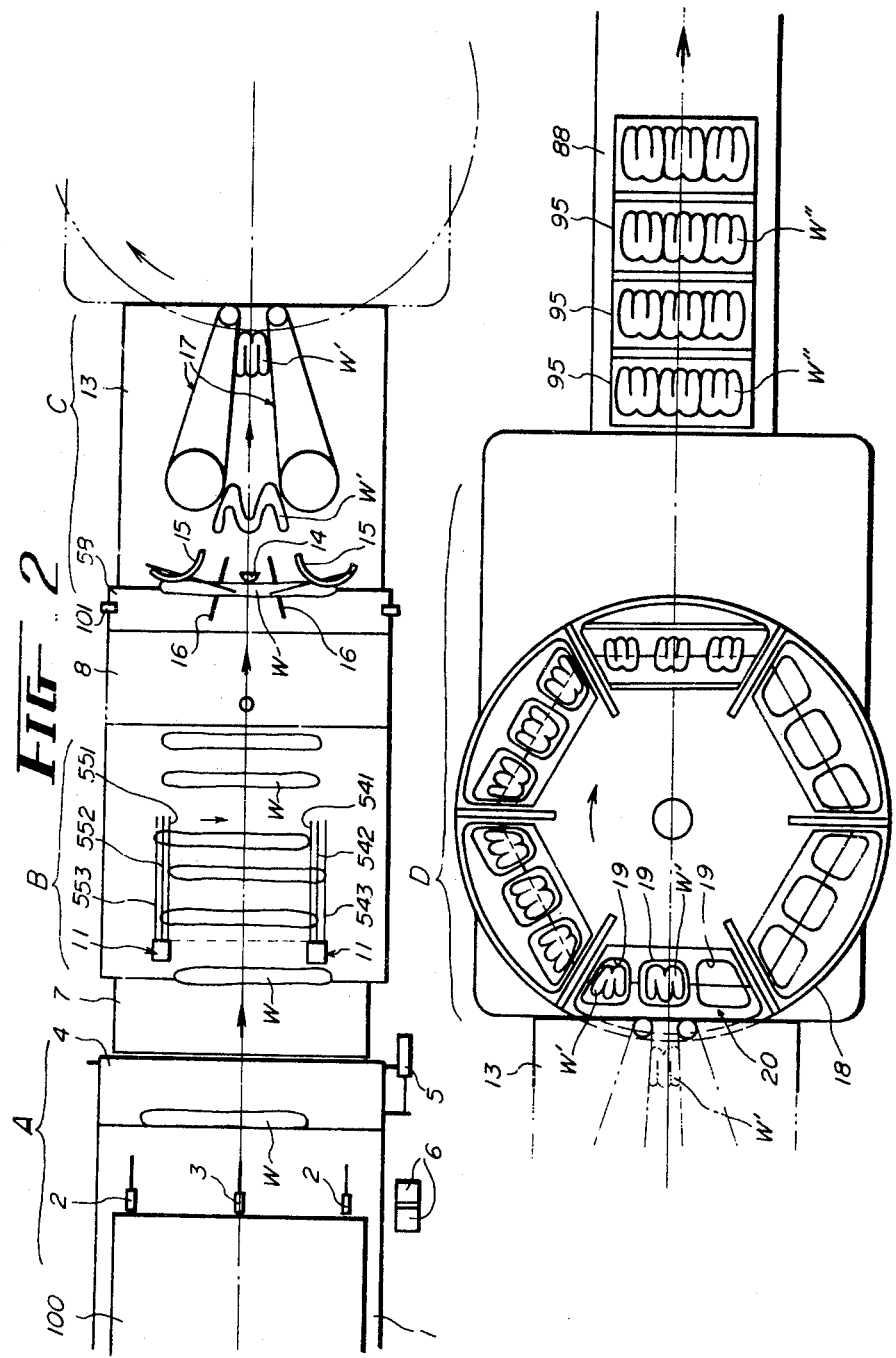

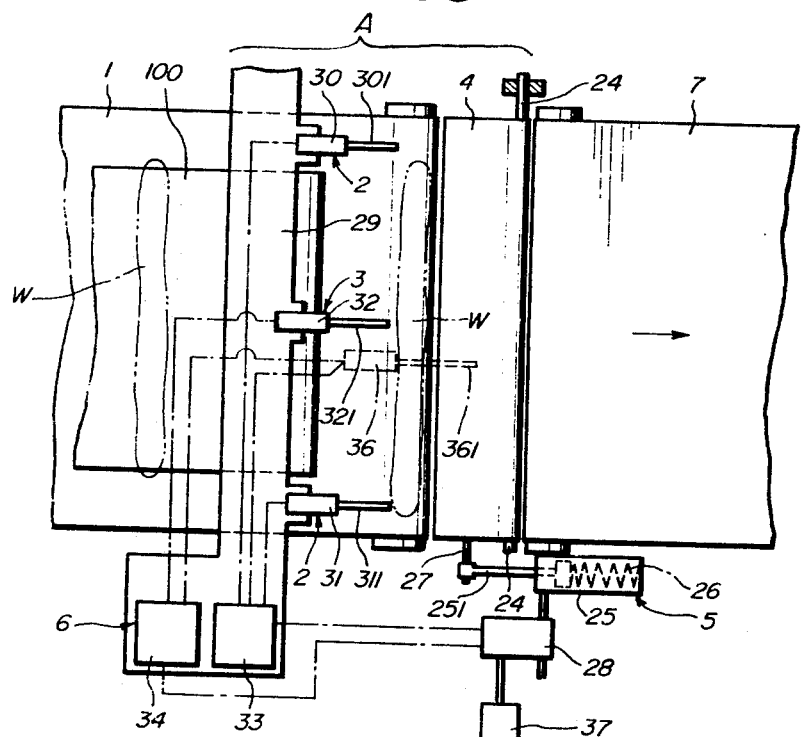
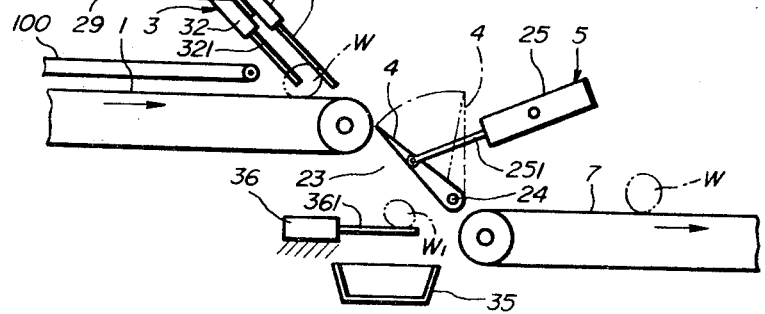

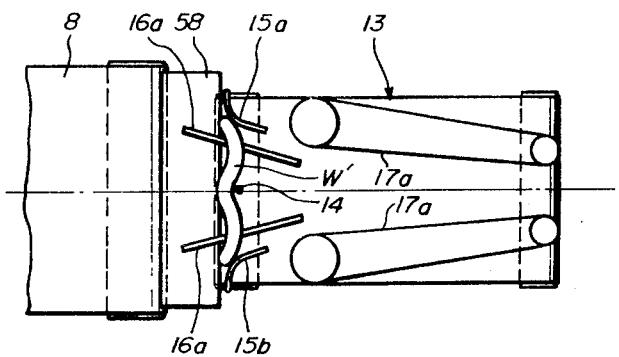
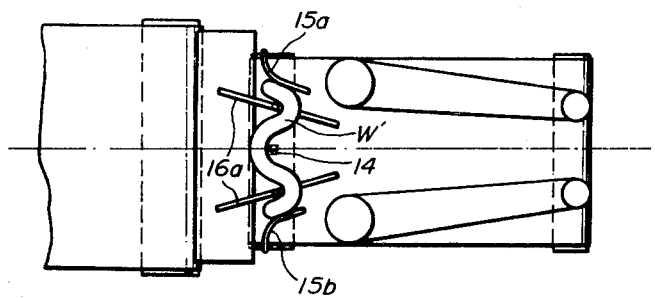
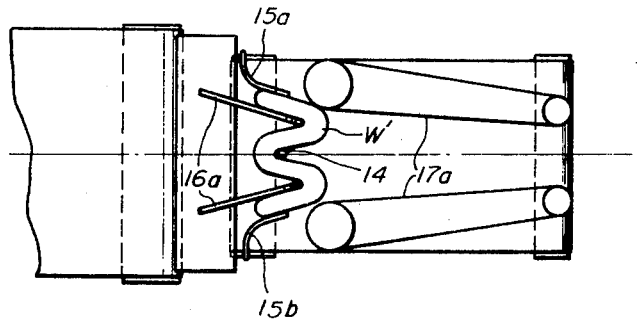

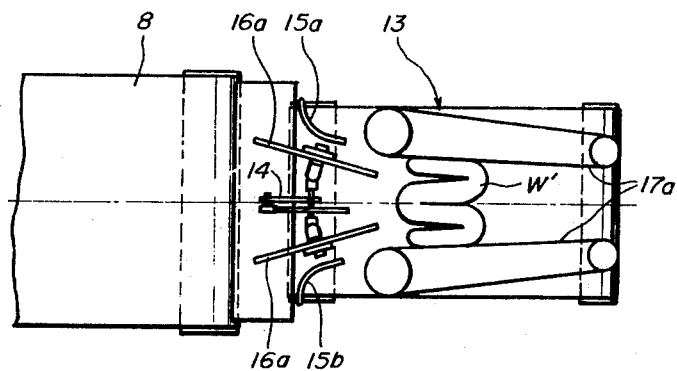
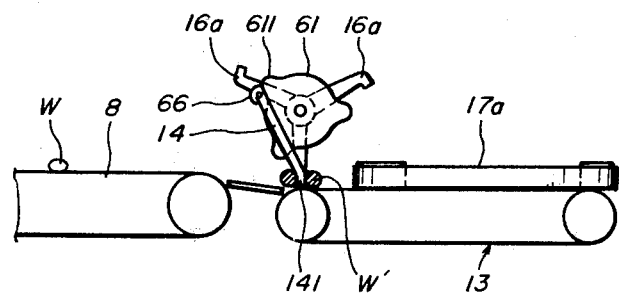
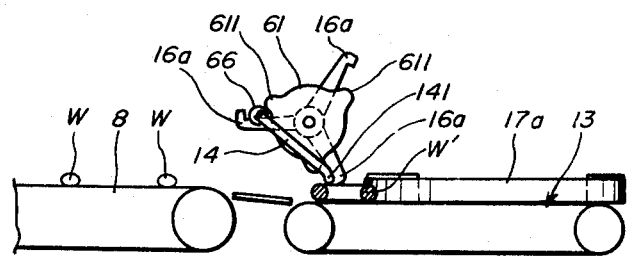

FIG_21

FULL-AUTOMATIC PANNING SYSTEM FOR WHITE BREAD PRODUCTION LINE

BRIEF DESCRIPTION OF THE INVENTION

The invention relates to a full-automatic panning system for a white bread production line, and more particularly to a novel panning system for automatically carrying out the bending of cylindrical dough pieces formed in a molder and conveyed intermittently and charging of the plural dough pieces into a bread pan.

In general, a white bread production process consists of molding the rounded dough which has passed the intermediate proofing or fermentation stage into a cylindrical dough piece by means of a molder, subsequently bending the dough into M-, N-, U- or twist types, panning a plurality of such bent dough pieces into bread pans, and, baking them after passing the final proofing and de-panning.

In the course of the above steps, a step where the cylindrical dough piece is bent and a plurality of bent doughs are panned into the bread pans is called the panning process. Quality (delicacy of bread fabrication) depends on this panning process, which is, therefore, of vital importance. In the conventional system, with regard to each of the steps of mixing materials to dividing, and rounding, molding, de-panning, slicing, wrapping and casing, those are almost perfectly mechanized, especially the deviding to the molding as well as final proofing to casing are full automatic, and the treatment by so called on-line system is carried out.

However, the panning process between the molding and final proofing has not been the subject of mechanization yet. Therefore, the line system is interrupted at this process. That is, the workers positioning at the outlet conveyor of the molder bend or twist the cylindrical dough pieces mannually into predetermined M-, N- or U-shapes, and charge a plurality of bent dough pieces into pans, but workings has to be speedy to meet the exhausting speed from the molder, for example, one second per one piece. In such practical circumstances, skill is required for the panning process, and besides many of the experts have to wait to change positions because of fatigue caused by to the working speed, resulting in high production cost and low efficiency. Further, since the panning conditions depend on skill of the workers, the panning conditions become uneven by difference in skill even with the same expert because of fatigue and working simplicity as time advances on. The bendings are irregular and the pannings in the bread pan are not uniform. Thus, uniform and well conditioned panning have not been provided.

The invention has been devised to remove the shortcomings, disadvantages and others brought about in the conventional panning procedures.

A primary object of the invention is to offer a novel panning system by which the process is automatic and carried out mechanically.

Another object of the invention is to offer a panning system which automatically detects and removes cylindrical dough pieces which are over length or doubled dough pieces, and which automatically detects and corrects lateral deviations in columns of dough for always obtaining uniformity of bending and regularity in the bread pan.

Also an object of the invention is to offer an automatic panning system where bent dough pieces are panned by pressing a plurality of bent dough pieces compactly without adhering to the compressing wall.

Still another object of the invention is to offer an automatic panning system where the cylindrical dough is bent arbitrarily into at least two shapes of M and U.

Yet another object of the invention is to offer an automatic panning system by which the said first to fourth objects may be accomplished by an apparatus of comparatively simple structure.

Thus, the system according to the invention uses a dough piece selector which, senses the cylindrical dough pieces formed by the molder and rolled out intermittently, detects the length and pitch with the preceeding piece to remove the longer dough pieces from the line, a centering machine which, the selected pieces move, detects the lateral deviation to correct the position by the deviating amount, a bending machine which bends the cylindrical dough pieces conveyed from said centering machine into the predetermined shapes, and a circular table type panning machine which receives one by one the dough bent by the bending machine, transfers it in succession and pans a plurality of them into the bread pan.

By conveying the cylindrical dough pieces in succession from the molder, each of them is bent uniformly and panned into the bread pan regularly. Labor may be curtailed in this process due to automation. When this system is incorporated into the previous and the following stages which have been already mechanized and automated, the white bread of good quality may be produced on-line with high working efficiency.

Other features, objects and advantages of the invention will be understood from the following description with reference to the accompanying drawings.

BRIEF DESCRIPTION OF THE DRAWINGS

FIGS. 1-a and 1-b are schematic side views showing an automatic panning system for white bread according to the invention, FIG. 2 is a plan view of the above, FIG. 3 is a plan view of a cylindrical dough piece selector according to the invention, FIG. 4 is a side view of FIG. 3

DETAILED DESCRIPTION OF THE INVENTION

Figure 5:
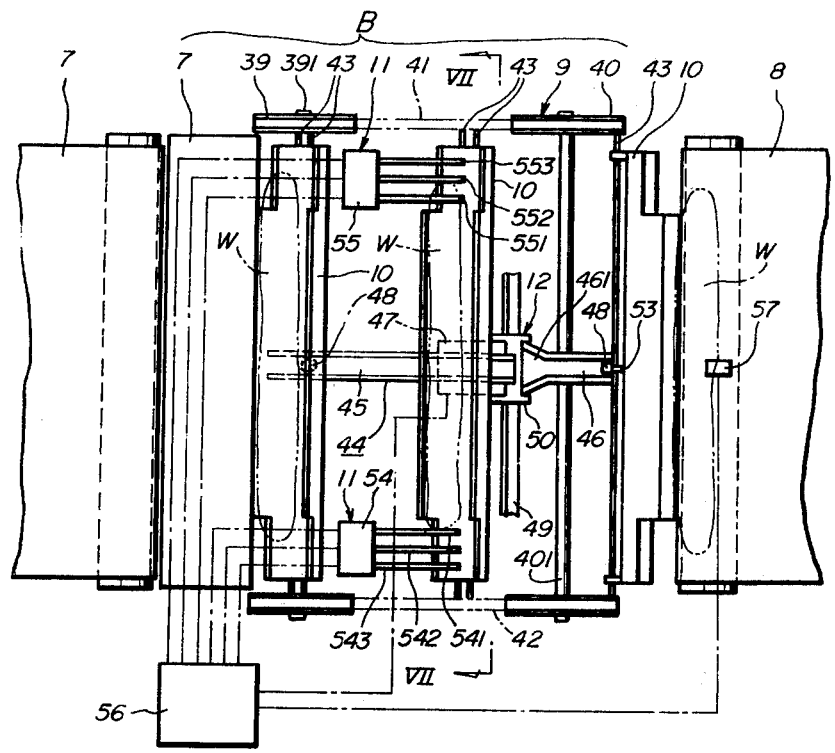
FIG. 5 is a plan view of a cross deviation modificating device for cylindrical dough piece.

FIGS. 1-a, 1-b and FIG. 2 show schematically the system of the invention, and this system is composed of a cylindrical dough piece selector A attached on a conveying path communicating to a molder main unit (not shown), a centering machine B connected to said selector, a bending machine C connected to said centering machine, and a circular table panning machine D installed after this bender. Those devices and machines are arranged in series as shown.

The selector A is composed of a conveyor 1 installed between the outlet of the molder and the front part of this selector, a length detecting device 2 positioned above the conveyor for detecting lengths of the cylindrical dough pieces W transferred piece by piece intermittently from the conveyor 1, a time-detecting device 3 for detecting pitches between adjacent pieces W W, a selecting plate 4 inclinably provided between said conveyor 1 and a following centering machine B, an actuating mechanism 5 for this selecting plate 4, and a control device 6 communicating to said detectors 2 3 and actuating the selecting plate 4 in response to signal issued from the detectors 2 3 so that too lengthy pieces, or such piece defining too narrow pitch relative to the antecedent dough pieces are removed from the conveyor 1.

Those are shown in detail in FIG. 3 and FIG. 4, above the conveyor 1 there is provided a dough rolling plate 100 such as plate or conveyor, and the dough piece transferred from the molder is rolled into the cylindrical shape by means of the rolling plate 100 and the conveyor 1. The selecting plate 4 is pivoted at a machine frame with axes 24 24 to bridge a space 23 between a front of the conveyor 1 and an intermediate conveyor 7 [this may be sufficient with conveyor or cross shaped wheel]. The actuating mechanism 5 to swing the selector 4 is composed of an actuating cylinder 25 and an air reserver 37 as shown in FIG. 3, the actuating cylinder 25 including a coil spring 26 therein for a piston rod 251 an end of which is connected to an axis 27 of the selector 4, and the air reserver 37 being connected to said actuating cylinder 25 via a control valve 28. Therefore, the control valve 28 is actuated by a later mentioned control device 6 so that compressed air gets into and out of the actuating cylinder 25 and accordingly the piston rod 251 is extended and shrunk to rotate the selector 4 around the axes 24 24 whereby the clearance 23 is opened and closed.

Next, the dough length detecting device 2 and the dough pitch detecting device 3 are provided on a support plate 29 over the conveyor 1. The length detector 2 is composed of two detect switches 30 31 positioned on the support plate 29 corresponding to both ends of the conveyor 1, and fingers 301 311 of said switches 30 31 are positioned nearly both ends of the conveying path of the cylindrical dough piece, and thus when too long a piece is conveyed to, either or both of the fingers 301 311 contact its end, whereby either or both of the detect switches 30 31 is actuated. The dough pitch detecting device 3 is composed of the detect switch 32 provided above the center of the conveyor 1, and this switch 32 has a finger 321 contacting all the moving dough pieces.

The control device 6 is composed of a first control box 33 and a second control box 34 provided on the support plate 29. The first control box 33 is connected with the length detectors 30 31 and the control valve 28 of the actuate cylinder 25. When the length detectors 30 31 are actuated by a too lengthy piece W1, the first control valve 33 is worked to rotate upwardly the selector 4 via the control valve 28 as shown with dotted lines in FIG. 4, whereby the clearance 23 is opened to drop it into a faulty dough pan 35 set under the conveyor 1. In the meantime, the second control box 34 is provided with a timer (not shown) through which 34 the dough pitch detecting switch 32 is connected to the control valve 28 of the actuate cylinder 25, and when the pitch time in which dough pieces W W contact the finger 321 exceeds the determined time the second control box 34 is not actuated but when it is faster the second control box is operated to work the control valve 28 and to open the selector 4 for dropping the following piece of the adjacent ones W W into the faulty dough pan 35 through the clearance 35.

Above the faulty dough pan 35 there is provided a selector switch 36 having a finger 361 to contact a dropping faulty dough piece W1, which switch 36 is connected to the control valve 28 via said first control box 33, and when the selector switch 36 is worked by the dropping piece W1 the control valve 28 is worked by the first control box 33 to recover the selector 4 to the initial closing condition.

The centering machine B is located between said selecting device A and the following bending machine C via the intermediate conveyors 7 and 8 for correcting in position one by one the dough pieces W having been selected in length and pitch to meet the center in length thereof to the center of the bending machine C. This centering machine B is, as shown in detail in FIG. 5 to FIG. 8, composed of an endless chain conveyor 9 installed in a manner that a front part is inclined upwardly, a plurality of baskets 10 which are equipped on the conveyor 9 slidably in length and each of which holds one dough piece therein, a detecting device 11 which is provided above the conveyor 9 for detecting unevenness in length of the dough piece W, and a controlling device 12 which is actuated by said detector 11 and slides the basket 10 laterally by a correcting amount of said unevenness of the piece W.

Figure 6:
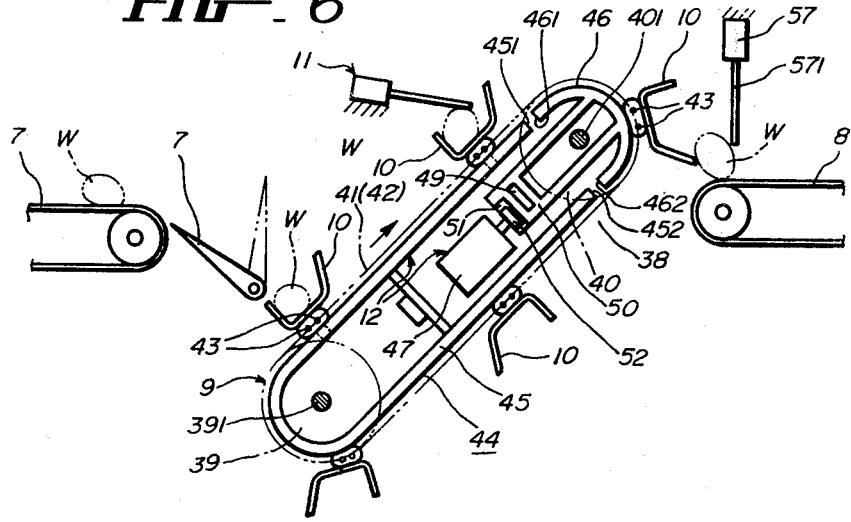
FIG. 6 is a plan view of FIG. 5.
Figure 7:
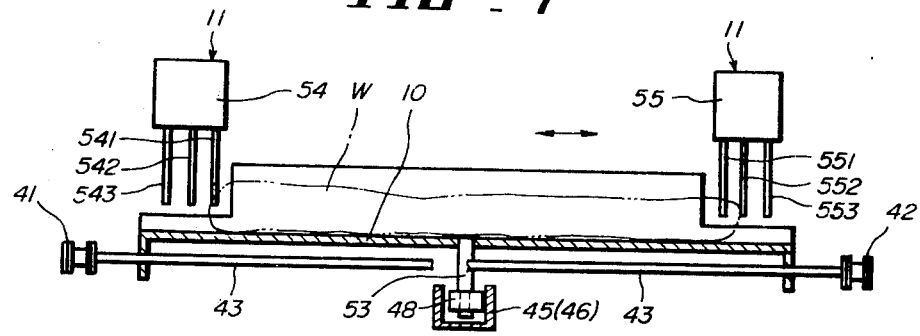
FIG. 7 is a cross section along line VII—VII of FIG. 5.

The conveying device 9 is, as shown in FIG. 5 and FIG. 6, composed of a lower sprocket chain wheel 39 and an upper sprocket chain wheel 40 which are installed in a large clearance 38 between the conveyors 7 8, and an endless roller chains 41 42 wound on the both wheels 39 40. The rear chain wheel 39 is positioned lower than the front chain wheel 40, and it is preferable that the front upper sprocket chain wheel 40 is the same level to or higher than the conveyor 8 and the conveyor of the bender C, so as to shorten the installing length. On the other hand, the basket 10 on the conveyor 9 is in such a shape that one side wall is as seen in FIG. 6 vertical to the bottom and another is oblique like a ship, and each of the baskets 10 is pivoted slidably in length as shown in FIG. 7 on a pair of cross bars 43 provided on the right and left endless chains 41 42. In this connection, though not shown, said conveyor 9 is connected with a sprocket wheel driving unit, and when one cylindrical dough piece W is fed into the basket 10 reaching at the top place of the lower sprocket wheel 39, the wheel is driven intermittently by intervals between the respective boxes 10.

Figure 8:
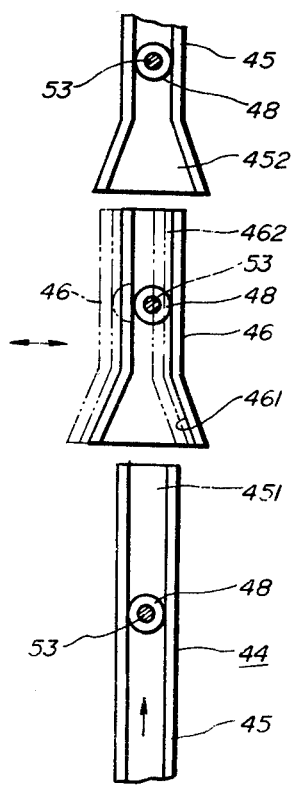
FIG. 8 is an enlarged developments of fixed guide rail and cross movable guide rail shown in FIG. 5.

The control device 12 which slides the dough basket 10 by the amount of cross devitation of the cylindrical dough piece is composed of girdle rail 44 which consists of fixed guide rail 45 and cross movable rail 46 between said endless chain follers 41 42, pulse motor 47 which slides the rail 46 to right and left, and roller 48 which is extended from the bottom of the basket 10 and guided by the girdle rail 44. The fixed guide 45 is in an elongated U shape terminated at ends 451 452, which is held by the machine frame between the endless chains 41 42, supports coaxally an axis 391 of the chain wheel 39 in a hemisphere and extends members concerned therewith toward an axis 401 of the upper chain wheel 40. On the other hand, the cross movable rail 46 supports coaxally an axis 401 of the upper chain wheel 40 in a hemisphere as shown in FIG. 6, and end portions 461 462 thereof face to end portions 451 452 of the fixed guide rail 45. Further, said cross movable rail 46 is made slidable in the lateral direction in such a way that a guide bar 49 is fixedly bridged to the machine frame and is idly mounted with a bracket 50 protruding from the center of the cross movable rail 46 and provides gearing of a gear rack 51 fixed on the bracket 50 with a pinion 52 of the pulse motor 47. The roller 48 is, as shown in FIG. 7, held on a roller axis 53 passing through said couple of the cross bars 43 43 from the bottom center of the baskets 10, the roller 48 being idle thereon. Therefore, the basket 10 is moved following rotation of the endless chains 41 42, so that the roller 48 of the basket 10 is guided along the girdle rail 44. That is, the roller 48 is advanced above the fixed rail 45 to the end portion 451 and subsequently guided to the cross movable rail 46 through the end portion 461 and then returned back to the initial position through the end portion 462, the lower front end portion 452 and the lower part of the fixed rail 45. In the course of the above procedure, when the cross movable rail 46 is shifted in the cross direction by means of a later mentioned means, the basket 10 is corrected in position via the roller 48 and the cross bars 43 43 by sliding in the cross direction. In this connection, the fixed rail 45 and the cross movable rail 46 are flared at upper rear end portion 461 and lower front end portion 452 as shown in FIG. 8.

The detecting device 11 detecting cross deviations of the cylindrical dough pieces W is, as shown in FIG. 5 to FIG. 7, composed of a left side deviation detecting switch 54 above the endless chain 41 and a right side deviation detecting switch 55 above another endless chain 42, on which the same numbers (three pieces shown in FIG. 7) of senser fingers 541 542 543 and 551 552 553 are provided equidistantly respectively in such a manner that these end portions are positioned at a center in width of the basket 10 [FIG. 5] as well as these fingers are at both ends of the dough piece of the standard length. The detecting switches 54 55 are connected to a cross shift controlling device 56 of the rail 46, and this controller 56 is connected to said pulse motor 47. Therefore, assuming that the left end of the dough piece W in the basket 10 contacts, for example, the fingers 541 and 542 of the left side deviation detecting switch 54 and at the same time contacts, for example, the inner finger 551 of the right side deviation detecting switch 55, then it will be seen that the dough piece W is positioned over the left side to the extent of difference between the fingers 541 542 and the finger 551, that is, by the space of the finger 542. In such a case, by the fingers 541, 542 and the finger 551, the cross shift controlling device 56 is actuated via the switches 54 55, whereby the pulse motor 47 is actuated to cause the cross movable rail 46 and the basket 10 to slide by a space between the fingers 542 543.

A reference numeral 57 shown in FIG. 5 and FIG. 6 is a discharged dough detecting switch having a finger 571 to contact the dough piece W discharged into the conveyor 8 from the basket 10, and this detecting switch 57 is also connected to the cross shift controlling device 56, and when the discharged dough piece W contacts the finger 571 the cross shift controller 56 is actuated to return the cross movable rail 46 to the initial center position by means of the pulse motor 47.

The bending machine C following the said centering machine B bends into a predetermined shape the dough piece W having been corrected in the lateral position by the centering machine B. The bending machine C is provided with a bottom belt 13 for feeding the cylindrical dough piece W at a right angle to the dough length, a hook lever 14 for temporarily stopping movement of the center portion of the moving dough piece W, a guide wall device 15 for guiding movement of the both ends of the dough W, a bending mechanism 16 for pushing the determined positions of said center positions and said both ends to the dough moving direction to bend the dough piece during the above two workings, and a side belt 17 for sandwitching the dough during conveying the bent dough on the belt 13.

The detailed structure of each of these members is shown in FIG. 9 to FIG. 18. This bending machine C has the conveyor 13 for the bent dough after the intermediate conveyor 8 between which a chute plate 58 bridges. Above this chute plate 58 there is provided a frame (not shown) supporting the bending machine body which is equipped with the above said hook lever 14, guide wall device 15 and bending mechanism 16.

Figure 9:
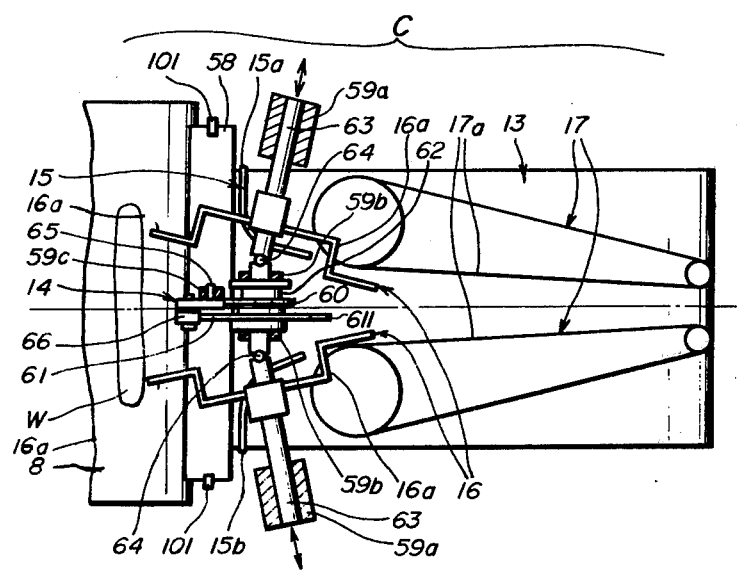
FIG. 9 is a plan view of a bending machine in the invention.

The above frame is, as shown in FIG. 9, provided with bearings 59a 59a at the both sides and center bearings 59b 59c in such a manner that only bearings may be moved as arrowed marks together with the frame, or without changing the space therebetween, and the center bearing 59b has a sprocket 60 and a rotating drum 62 with a cam plate 61 extending equidistantly cams of appropriate number (three cams shown). The rotating drum 62 is connected via a universal joint 64 to inner ends of rotating axes 63 63 pivoted with the bearings 59a 59a. The axes 63 63 are slightly oblique to the center line of the rotating drum 62. The sprocket 60 is connected to a prime mover via a chain or the like to rotate the rotating drum 62, cam plate 61 and later mentioned a dough bending arms.

Figure 10:
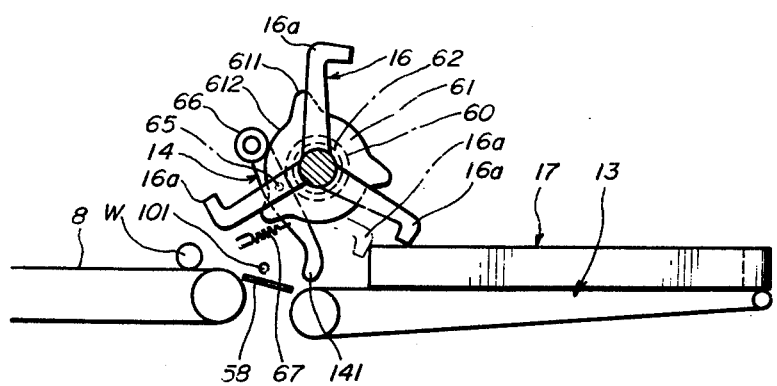
FIG. 10 is a side view of FIG. 9, FIG. 11 to FIG. 14 show conditions of bending a cylindrical dough piece into M-shape by means of the bending machine in FIG. 9 and FIG. 10, FIG. 15 and FIG. 16 are side views of FIG. 12 and FIG. 13.
Figure 17:
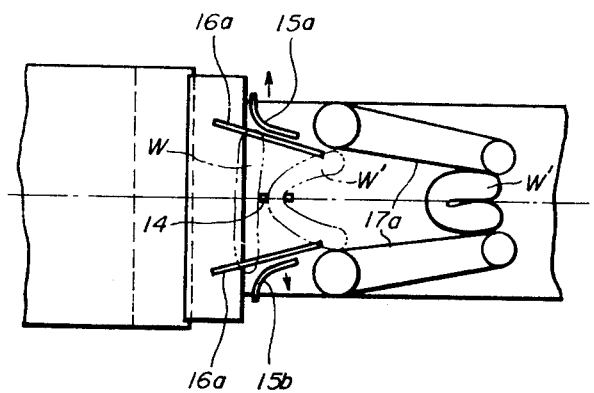
FIG. 17 is a schematic plane view showing a condition of bending a cylindrical dough piece into U-shape by means of the bending machine in FIG. 9 and FIG. 10.
Figure 18:
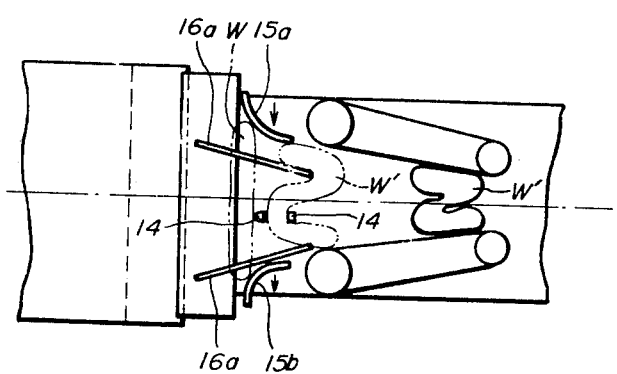
FIG. 18 is a schematic plan view showing a condition of bending a cylindrical dough piece into N-shape by means of a bending machine in FIG. 9 and FIG. 10.

The movement of the center portion of the moving cylindrical dough piece W is temporarily stopped by an arm 14 which is pivoted to another bearing 59c and has a hook like swelling 141. This arm 14 has a roller 66 at its end portion which is always pressed to outer circumference the cam plate 61 by means of a spring 67 and which is normally positioned near above the guide plate 58 as shown with the solid line in FIG. 10. The bending mechanism 16 which bends the center portion of the dough piece W and the predetermined position between both ends by pushing to the transferring direction is formed by radially extending dough bending arms 16a 16a of the same number of cams 611 from the respective rotating axes 63 63. The guide device 15 which guides the movement of both end of the dough piece W is composed of the plates or rolls 15a 15b provided above the conveyor 13 outside of the bending arms 16a 16a and may be moved inwardly and outwardly with an appropriate means (not shown) in accordance with desired shapes. The side belting device 17 sandwiching the bent dough W' is formed with side pressing belts 17a 17a on the right and left on the bottom belt 13. A space between these belts 17a 17a becomes narrow along the moving direction, so that the bent dough W' is pressed while being guided. A reference numeral 101 in FIG. 9 and FIG. 10 is a dough inlet detector such as a photo switch provided near the chute plate 58, and when a light beam is interrupted by the dough piece, the rotating drum 62 and the cam plate 61 are rotated by one pitch of the cam 611.

The circular table panning machine D receives the bent dough piece W conveyed from the bending machine C and puts a plurality of the pieces into the bread pan. This panning machine is provided with a circular table 18 set horizontally rotatably just after the bottom belt 13, pocket plates which are arranged equidistantly on circumference of said table 18 and have a plurality of pockets each of which holds therein one bent dough W' sent from the bottom belt 13, a table swiveling mechanism 21 which intermittently rotates in a fixed direction the table 18 at each time when one dough piece W' is charged into said pocket 19, and a pocket plate dropping-out mechanism 22 which hinges down a bottom of the pocket plate 20 reaching at the determined position of the table 18 to drop out several doughs simultaneously.

Figure 19:
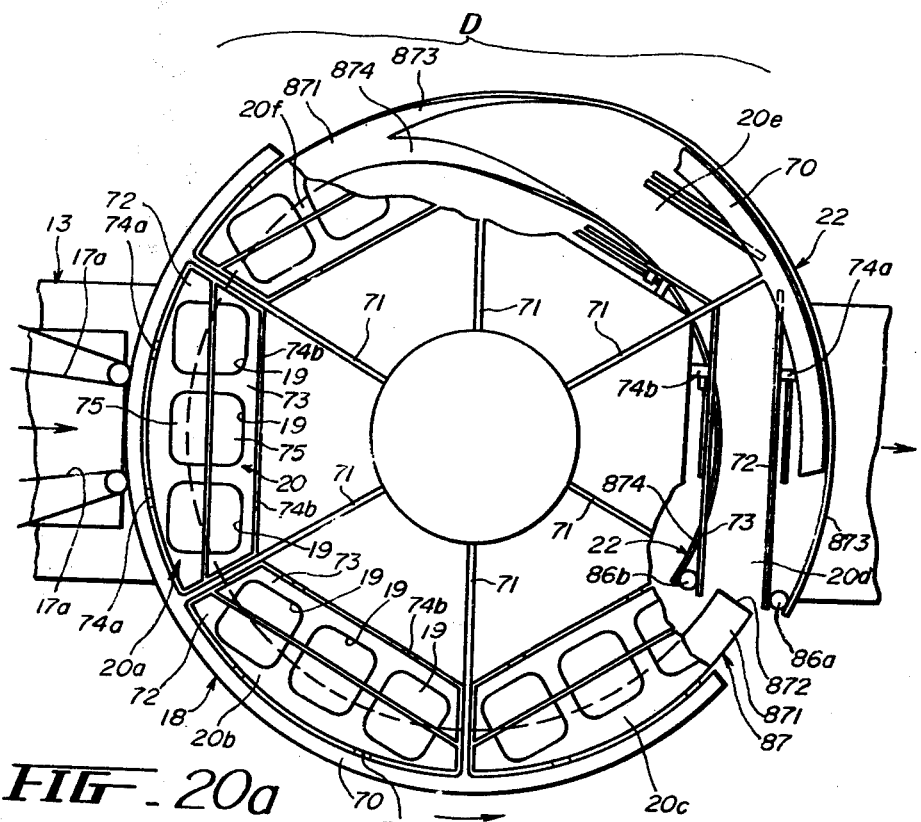
FIG. 19 is one example, partially in section, of a circular table panning machine according to the invention.
Figure 20A:
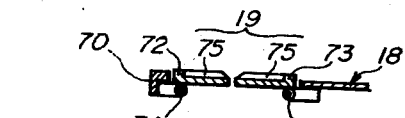
FIG. 20 is a vertical cross side view of FIG. 19, FIG. 20-a is a cross section of a dough receiving pocket plate.
Figure 20:
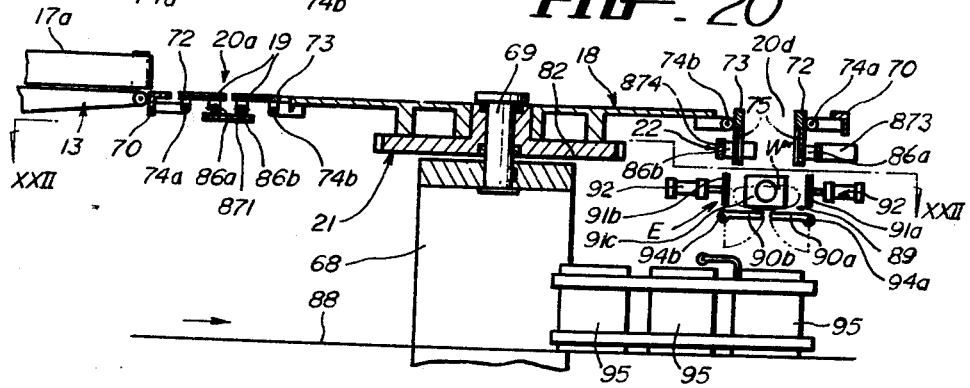

The above mentioned mechanism will be discussed with reference to FIG. 19 to FIG. 24. There is provided a saddle frame 68 as shown in FIG. 20 where an axis 69 is vertically pivoted on which said table 18 is attached. The circular table 18 is provided on its outer circumference with a circular rim 70, to which wall ribs 71 are extended from the center of the table 18, and outer base plates 72 and inner base plates 73 are pivoted with axes 74a 74b at positions near the rims 70 between the wall ribs 71 71, and these base plates 72 73 and ribs 71 71 define pocket plates 20a 20b 20c 20d 20e 20f of the same number of the ribs 71.

Figure 21:
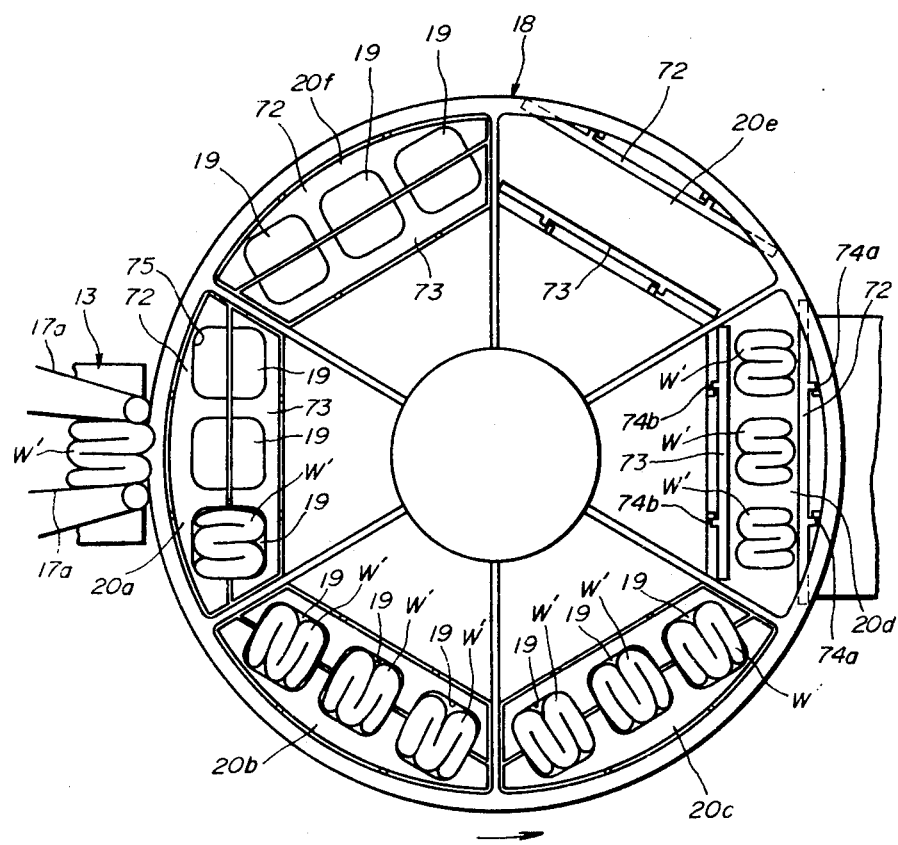
FIG. 21 is a plan view showing a situation wherein doughs are fed onto the embodiment of FIG. 19.
Figure 23:
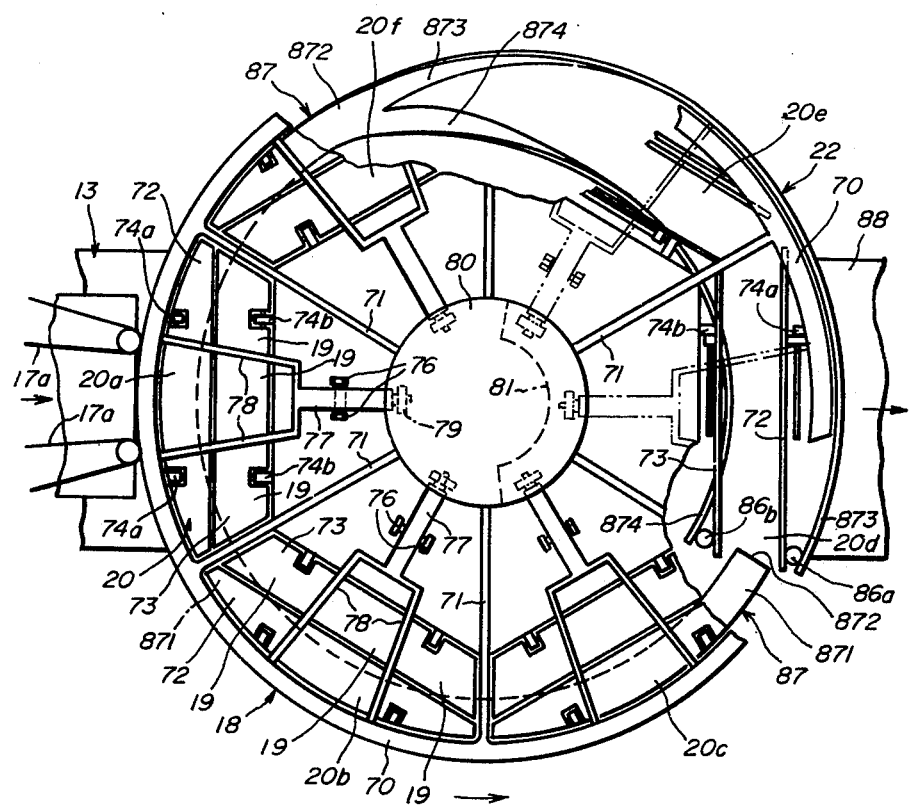
FIG. 23 is another example, partially in section, of a circular table panning machine according to the invention.
Figure 24:
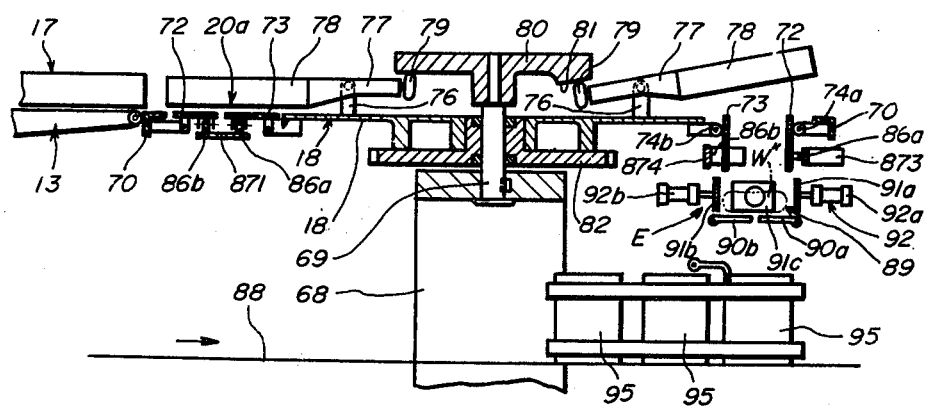
FIG. 24 is a vertical side view of FIG. 23.

In the pocket plates 20a to 20f, there are pockets 19 one of which holds one bent dough W'. This pocket 19 may have a half concaved portion 75 at the base plates 72 and 73, which is a rectangular concave when these plates 72 73 are horizontal (conditon), as shown in FIG. 19 to FIG. 21. This is perferable for simplifying the structure of the pocket 19. It may be another means for obtaining a pocket as shown in FIG. 23 and FIG. 24 to provide hinge pins 76 76 on the table 18, pivot rotating arms 77 thereto, extend space plates 78 78 therefrom, and partition the interiors of the pocket plates 20a 20b . . . by means of said space plates 78 78. In this example, the rotating arm 77 is equipped at its inner end with a roller 79, and on the other hand the circular table 18 is fixed on its axis 69 with a cam plate 80 at a lower portion of which an arc cam 81 is formed to contact with said roller 79 and retreat the space plates 78 78 above the pocket plates 20a 20b . . . when opening later mentioned pocket plates.

Figure 22:
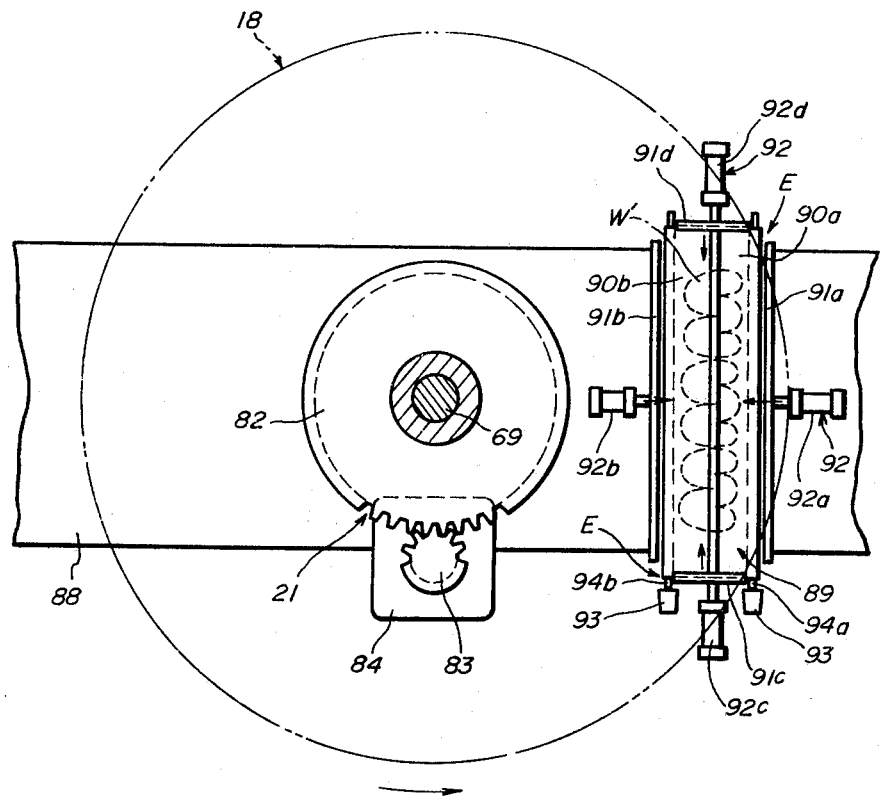
FIG. 22 is a cross section along line XXII-XXII of FIG. 20.
Figure 25:
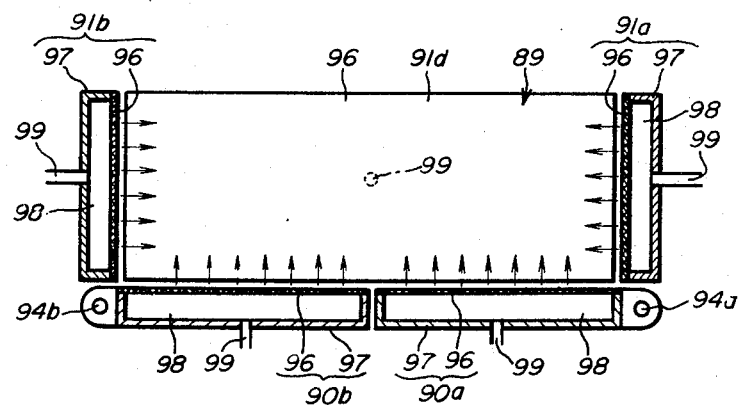
FIG. 25 is an enlarged cross section of a dough piece compressing portion.

The circular table 18 has a swivel drive unit 21. As shown in FIG. 22, this drive unit 21 is provided with a bull gear 82 fixed to the axis 69 and a driving mechanism 84 having a pinion 83 to engage with the bull gear 82, and further it is provided with a drive control unit to detect conveying of the bent dough W' to the pockets 19 of the pocket plates 20a 20b . . . from the conveyor 13 and to control the driving mechanism 84, whereby at every time when one bent dough W' is charged into one pocket 19, the circular table 18 is rotated intermittently by one pitch of the pockets 19 19.

The pocket plate dropping-out mechanism 22, in the embodiments shown in FIG. 19 to FIG. 22 as well as those in FIG. 23 and FIG. 24, has rollers 86a 86b equipped on the reverse sides of the base plates 72 73 and large rail cam 87 fixed on the outer circumference of the table 18 to work said rollers 86a 86b. In this connection, the rail cam 87 is, as shown in FIG. 19 or FIG. 23, a flat plate cam 871 at an opening position and at a position under the pocket plates 20a 20b 20c corresponding to the front part of the conveyor 13, and terminates at an end 872 between the pocket plates 20c and 20d. Therefore, while the rollers 86a 86b are mounted on the flat plate cam 871 the base plates 72 73 are closed, and when the plates 72 73 come to a position corresponding to the pocket plate 20c the roller 86a 86b get out the flat plate cam 871 to hinge out the base plates 72 73 downwardly. An opposite end to the end 872 of the flat plate cam 871 is branched into an outer inclinded cam 873 and an inner inclined cam 874 which are twisted to gradually increase inclinations and stand vertically under the pocket plate 20d at the opening position in which these cams 873 874 contact to the rollers 86a 86b of the base plates 72 73. Therefore when the opened base plates 72 73 are swiveled in company with swiveling of the circular table 18, the base plates 72 73 are gradually closed by the inclined cams 873 874, and when the rollers 86a 86b are mounted on the flat plate cam 871 the base plates 72 73 are perfectly closed.

In addition to the above mentioned structures, the circular table panning machine D is also characterized by providing the dough piece compressing device E which further compresses a plurality of the doughs exhausted from the pocket plates 20a 20b . . . into compacts, and then sets them in the bread pan. In other words, this compressing device E is provided with a pan conveyor 88 installed under the pocket plate which exhausts a plurality of the doughs simultaneously, a plurality of openable bottom plates 90a 90b between the pocket plates, a dough compression portion 89 of four side plates 91a 91b 91c 91d surrounding these bottom plates, a dough compression means 92 pushing inwardly said plates 91a to 91d when the dough compression portion 89 receives the doughs, and a compression portion opening mechanism 93 opening the bottom plates 90b 90b of said dough compressor 89 after completing compression to drop the compressed dough W'''.

The bottom plates 90a 90b are rotatable around hinged axes 94a 94b horizontally or downdwardly under the pocket 20d shown in FIG. 19 or FIG. 23, and said four side plates 91a to 91d are slidable on the bottom plates 90a 90b. The compressor 92 is composed of cylinders 92a 92b 92c 92d connected with piston rods behinds the respective side plates 91a to 91d. Thus when the bent dough W' is dropped onto the bottom plates 90a 90b, all the side plates 91a to 91d compress the dough into the compact, and when compression is completed these plates 91a to 91d are returned back to the initial position. The dough compressor-opening means 93 are connected to the hinged axes 94a 94b for hinging down these axes 94a 94b to drop the compressed dough W" into the bread pan 95 mounted on the pan conveyor 88. The bread pans 95 are controlled in such a manner that they are positioned intermittently one by one under the bottom plates 90a 90b when these plates are opened. Said compression portion 89 contacts the dough when the components thereof, that is, the bottom plates 90a 90b and the side plates 91a to 91d, are carrying out compression. Since the dough is adhesive, difficulties will arise. In this regard, the invention preferably composes said bottom plates 90a 90b and side plates 91a to 91d with inner wall plates 96 contacting the dough and outer plates 97 surrounding the plates 96 which define an air chamber 98 therebetween, and the outer plate 97 is connected with an air inlet 99 communicating to the air chamber 98. The inner wall plate 97 is composed of porous material such as, for example, laminated porous sintered metal or wire net. In this way, the air is exhausted from the surface of the inner wall plate 96 all over the walls to form an air layer between the dough and the wall 96 to prevent from adhesion.

Operation and working of the automatic panning system according to the invention will be described. The doughs conveyed in succession from the moulder (not shown) are rolled by the conveyor 1 and the dough rolling plate 100 into cylindrical dough pieces, and the cylindrical dough pieces W are transferred at intervals one by one towards the circular table panning machine D. However the cylindrical dough pieces W are being conveyed in disorder at this stage in length or pitch between the preceeding and subsequent pieces. If such pieces W are fed as they are to the bending machine C and the panning machine D, bendings are uneven or panning is not uniform, and when the pitch is too narrow, doubled pieces are brought about. Such faulty dough pieces are automatically detected and removed during conveying by means of the removing device A. When the cylindrical dough piece W is conveyed, it is detected by the length detecting switches 20 31 and the pitch detecting switch 32. The piece within the determined length does not contact the fingers 301 311 of the detectors 30 31 set in a space within the determined length, but too lengthy piece contacts and actuates the switches 30 31 so that the selecting plate 4 is rotated as shown with the dot line in FIG. 4 via the first controller 33 by the control valve 28 and the actuating cylinder 25. Thus such a lengthy piece is automatically dropped into the faulty dough pan 35 after the conveyor 1. In the meantime, the finger 321 of the pitch detector 32 having a timer contacts each of the dough pieces. When a time interval available thereby is shorter than the fixed period of time, the second controller 34 is actuated by said switch, and then the selecting plate 4 is opened similarly to the former case, the subsequent piece of the adjacent pieces is automatically dropped into the faulty dough pan 35.

The cylindrical dough pieces W fed successively from the molder are substantially uniform in length and pitch, and substantially uniform pieces only are transferred forwardly through the selecting plate 4 and the intermediate conveyor 7.

However, in this regard there are the pieces of lateral deviation, though in order of length and pitch. If such dough pieces are subjected to the bending machine, the automatic bending cannot be carried out exactly. The ensuing centering machine B detects the lateral deviations to effect a cross movement for correcting the position. The cylindrical dough piece W is charged from the intermediate conveyor 7 to the basket 10 on the endless chain driving connveyor 9, and the basket 10 holding the dough therein moves to the arrow mark as shown in FIG. 1 and FIG. 6, and the following dough piece W are also transferred one by one. When the dough piece comes to the top of the conveyor 9, it contacts a plurality of the fingers 541 542 543 and 551 552 553 which are provided equidistantly on the left detector 54 and the right detector 55. Therefore, it will be appreciated that the contacting number to the fingers 541 542 543 and 551 552 553 is different in response to the direction and amount of the deviation of the dough piece W. The deviation direction and amount are automatically decided by the contacting position and number, and a signal is issued to the pulse motor 47 from the switches 54 55, and when the pocket 10 containing the detected dough comes to the cross movable rail 46, this rail 46 is slided transversally to the transferring direction by the deviation amount. Thereby, the pocket 10 also slides so much and the centers of the cylindrical dough pieces W are set in order. The corrected dough piece is then transferred to the intermediate conveyor 8.

The cylindrical dough pieces W transferred by the intermediate conveyor 8 are fed one by one to the bending machine C for bending it into a predetermined shape. While conveying the dough piece on the conveyor 8, the rotating drum 62 is at rest, and the bending arms 16a 16b and the cam 61 are at rest, accordingly. At such a time, since the central arm 14 which temporarily stops the movement of the center part of the cylindrical dough piece contacts the circular arc 612 between the cams 611, the hook 141 at end portion of the arm 14 enters the travelling path of the dough piece. When desiring the M-shape of the dough piece, the central arm 14 is in advance positioned on the center line in width of the conveyor 13 as shown in FIG. 11 as well as the bending arms 16a 16a are positioned between the central arm 14 and the both end guiding means 15. In this way, the center part of the piece W is checked as shown in FIG. 11, and at the same time the both ends thereof are effected with resistance to advancing by contacting the plates or rollers 15a 15b of the guide plate 15. Then, since the dough piece W is detected in advancing by the inlet detector 101, the rotating drum 62 is rotated by the determined pitch in response to the signal from this detector 101 to rotate the bending arms 16a 16b and the cam plate 61, and the bending arms 16a 16a guide the dough piece W to the transferring direction between the hook 141 of the arm 14 and the plates or rollers 15a 15b, thereby bending it into the desired M-shaped as shown in FIG. 12 and FIG. 13. When the bending is completed as shown in FIG. 15 and FIG. 16 through FIG. 13, the roller 66 is pushed by the cam 611 and the bending arms 16a 16a are separated from the dough. A relax M-shaped dough is compressed between the compressing belts 17a 917a into a closed M-shape and is fed to the circular table panning machine D. In this connection, the cam plate 61 and rotating drum 62 stop and return to the initial positions when the cam 611 is separated from the roller 66. The bending arms are shown in concave configurations at the center parts in FIG. 9 and FIG. 10 due to the spaces employed, but FIG. 11 and the followings show the straight arms for convenience.

On the other hand, when desiring the U-shape, the space between the plates or roller 15a 15b is broadened and the bending arms 16a 16a are so positioned as to contact the end portions of the cylindrical dough piece W, whereby the guidings for these both end portions are weakened and the desired U-shape may be obtained by the arm 14 and the bending arms 16a 16a.

Further, when desiring the N-shape, the arm 14 is moved slightly together with the bending arms 16a 16a to the left or right in width from the center of the conveyor, and either of the plates or rollers 15a 15b is positioned outwardly. The N-shape may be obtained easily.

In the above manners, the cylindrical dough pieces W are bent one by one into the desired shapes, and the bent doughs are charged into the pockets 19 of the circular takes panning machine D from the bottom belt 13. The circular tables 18 of the panning machine D is rotated transmittently by a fixed pitch through the drive unit 84, gears 82 83 and controller. Therefore, when the bent dough W' is charged into one pocket 19, a following empty pocket 19 is rotated to the conveyor 13. Repetition of such operations reveals the condition as shown in FIG. 21. The pockets 19 in the positions 20b 20c 20d hold the doughs therein. When the pocket plate comes to the position 20d, the outer base plate 72 and the inner base plate 73 defining the bottom of the pocket 19 are released from the relation between the rollers 86a 86b and the rail cam 87, and a plurality of doughs within the pocket plate 20d are dropped into the compresser E to compress them by means of the cylinders 92a 92b 92c 92d and the side plates 91a 91b 91c 91d. The compressed doughs W" are charged into the bread pans 95 and transferred on a conveyor 88 to a baking oven.

The system according to the invention may be modified and such modifications are included in claims.

I claim:

1. An automatic panning system for white bread production line, including an elongated travel path having a plurality of work stations in series; comprising:
    a. dough piece-selecting device (A) first work station which detects cylindrically formed dough pieces in a molder and transfers these one by one intermittently said device having means selecting and removing cylindrical dough pieces longer than a predetermined length and making a narrow pitch with a preceeding dough piece,
    b. a centering machine (B) second work station fed by said first work station operable to transfer the selected dough pieces including sensing means for sensing for lateral deviations in a column of the transferred detected dough pieces to correct them by the deviating amount,
    c. a bending machine (C) third work station fed by said second work station operable to bend the cylindrical dough peices transferred from the centering machine into predetermined shapes, and,
    d. a circular table panning machine (D) fourth work station fed by said third work station having means to receive the bent dough pieces one by one and moving them successively to pan a plurality of the dough pieces into a bread pan.

2. A system according to claim 1, wherein the dough piece-selecting device (A) is provided with a conveyor (1) installed at an outlet of the molder, a length detecting device (2) for detecting the length of the cylindrical dough piece installed above the conveyor (1), a dough pitch detecting a device (3) for detecting time-interval of the dough piece transferred on the conveyor (1), a selecting device (4) inclinably installed between said conveyor (1) and the following centering machine (B), and a controlling device (6) for communicating an actuating machanism (5) of the selecting device (4) to said detectors (2)(3) and inclining the selecting device (4) in response to a signal issued from the detectors (2)(3) to drop out faulty doughs.

3. A system according to claim 2, wherein the length detector (2) and the pitch detector (3) are respectively composed of detecting switches (30)(31)(32) provided above the conveyor (1), fingers (301)(302) of the length detecting switches (30)(31) are positioned near both ends of the conveyor (1) to contact a too lengthy dough piece only, and the pitch detecting switch (32) has a finger (321) to contact all of the cylindrical dough pieces transferred on the conveyor (1).

4. A system according to claim 2, wherein the controlling device (6) is composed of a first controller (33) and a second controller (34), the first controller (33) being connected with the length detecting switch (30) and a controlling valve (28) of an actuating cylinder (25) to incline the selecting plate (4) for opening the plate (4) with the first controller (33) when the length detecting switches (30)(31) are actuated by a too lengthy a dough piece, and the second controller (34) being connected with the pitch detecting switch (32) and the controlling valve (28) of the actuating cylinder (25) for releasing the selecting plate (4) with the second controller when a time interval is shorter than a fixed period of time when the cylindrical dough piece contacting the finger (321).

5. A system according to claim 2, wherein a fault dough pan (35) is provided under the selecting plate (4) and a dough removal detecting switch (36) having a finger (361) is provided above the faulty dough pan (35) to contact dropping fault doughs ($W_1$), the detecting switch (36) being connected to the controlling valve (28) via the first controller (33) for returning back the selecting plate (4) to an initial closing condition, when said faulty dough contacts the finger (361), via the controlling valve (28) by said detecting switch (36).

6. A system according to claim 1, wherein the centering machine (B) between said selecting device (A) and bending machine (C), is provided with an endless chain conveyor (9) which is so arranged that a front part thereof is inclined upwardly, a plurality of dough pocket plates (10) which are equipped on said conveyor (9) slidably in transverse thereto and each of which holds one cylindrical dough piece, a cross deviation detecting device (11) which is provided above said conveyor (9) for detecting cross deviations of the dough piece in the pocket plate (10), and controlling device (12) which is actuated by said detecting device (11) to slide the pocket plate (10) to the extent of correcting said cross deviation.

7. A system according to claim 6, wherein the endless chain conveyor (9) is composed of a lower chain wheel (39), an upper chain wheel (40) and right and left endless chains (41)(42) which are provided with a pair of cross axes (43)(43) and on which the pocket plates (10) of ship like cross section are slidable along said cross axes (43).

8. A system according to claim 7, wherein the controlling device (12) for laterally sliding the pocket plate (10) which is composed of a girdle rail (44) including a fixed rail (45) and cross movable rail (46) between said endless chains (41)(42), a pulse motor (47) for sliding the cross movable rail (46), and a roller (48) extending from the bottoms of the pocket plates (10) to engaging the girdle rail (44).

9. A system according to claim 6, wherein the cross deviation detector (11) is composed of a left deviation detecting switch (54), a right deviation detecting switch (55) provided above the endless chains (41)(42), and a cross shifting controller (56) connecting said pulse motor (47) to said both switches (54)(55) on which the same number of fingers (541)(542)(543) and (551)(552)(553) are equidistantly provided to positions in the center of the pocket plate (10) at conveying paths of both ends of the cylindrical dough piece.

10. A system according to claim 1, wherein the bending machine (C) is installed between said centering machine (B) and circular table panning machine (D), and provided with a conveyor (13) which conveys the cylindrical dough piece (W) to a right angle direction with its length, a stopping mechanism (14) which temporarily stops movement of the center of said dough piece, a guiding mechanism (15) which guides movements of both ends of the dough piece, a bending mechanism (16) which pushes predetermined portions between the center and ends of the dough piece to the conveying direction while said two mechansim are working on the dough piece, and a compressing mechanism (17) which sandwiches the bent dough (W') while conveying it.

11. A system according to claim 1, wherein a rotating drum (62) is provided above the center of the conveyor (13), fixed with a sprocket wheel (60) and a cam plate (61) on its outer circumference, connected with rotating axes (63)(63) at both ends via a universal joints (64), provided with an arm (14) at its center part in such that an upper roller (66) always presses the outer circumference of the cam plate (61) by a spring (67), arranged radially with bending arms (16a)(16a) of the same number as cams (611) around said rotating axes (63), and furnished with plates or rollers (15a)(15b) above the conveyor (13) outsides of the bending arms (16a)(16a).

12. A system according to claim 10, wherein the compressing mechanism (17) is composed of conveyors (17a)(17a) which are furnished on the conveyor (13) and become narrow in space therebetween along the conveying direction.

13. A system according to claim 1, wherein the circular table panning machine (D) is provided with a circular table (18) swiveling horizontally in front of the conveyor (13), the dough pocket plate (20) having a plurality of pockets (19) formed equidistantly on the circumference (18) for receiving one bent dough per one pocket, a table swiveling mechanism (21) swiveling said table (18) intermittently to one direction evey time when said pocket (19) receives one bent dough, and a pocket plate-dropping-out mechanism (22) opening the bottom of the pocket plate (20) to drop the bent doughs (W')(W')(W') simultaneously.

14. A system according to claim 13, wherein the pocket plate (20) is composed of wall ribs (71)(71) extending radially from the center of the circular table (18) to a circular rim (70), an outer base plate (72) and an inner base plate (73) which both plates are pivoted to hinge down with axes (74a)(74b) near said rim (70) between the ribs (71)(71), the plates (72)(73) and the ribs (71)(71) defining dough receiving pockets plates (20a)(20b)(20c)(20d)(20e)(20f).

15. A system according to claim 13, wherein pockets (19) of the pockets plates (20a) to (20f) are half concave portions (75) defined with the outer base plates (72) and the inner base plates (73).

16. A system according to claim 13, wherein the pocket (19) is formed with an arm (77) pivoted by pins (76)(76) on the circular table (18) and a plurality of space plates (78)(78) extended from the arm (77) at inner end of which a roller (79) is equipped for engaging with an arc cam (81) formed in a cam plate (80) supported on a vertical pivot axis (69) of the circular table (18).

17. A system according to claim 13, wherein the pocket plate-dropping-out mechanism (22) is composed of the outer base plate (72) of the pocket plates (20a) to (20f), rollers (86a)(86b) equipped on reverse side of the inner base plate (73), and a large rail cam (87), the rail cam (87) being a flat plate cam (871) in front of the conveyor (13) and at a position where the pocket plate is opened, which cam (871) is terminated at an end (872) and is branched at another end into an outer inclined cam (873) and an inner inclined cam (874) said cams being twisted to increase inclination and stand vertically under the position where the plate is opened.

18. A system according to claim 1, wherein the circular table panning machine (D) is provided with the circular table (18) swiveling horizontally in front of the conveyor (13), the dough pocket plate (20) having a plurality of pockets (19) formed equidistantly on the circumference (18) for receiving one bent dough per one pocket, a table swiveling mechanism swiveling said table (18) intermittently to one direction every time when said pocket (19) receives one bent dough, a pocket plate-dropping-out mechanism (22) opening the bottom of the pocket plate (20) to drop the bent doughs (W')(W')(W') simultaneously, and the dough compressing mechansim (E) compressing the dropped bent doughs and panning them into the bread pan (5).

19. a system according to claim 18, wherein the dough compressing mechanism (E) is provided with a dough compressing portion (89) composed of openable bottom plates (90a)(90b) equipped under the pocket plate (22) and four side plates (91a)(91b)(91c)(91d) surrounding the bottom plates (90a)(90b), a dough compressing mechanism (92) pushing said side plates (91a) to (91b) inwardly, and a compressor opening mechanism (93) opening the bottom plates (90a)(90b) of said dough compressing portion (89) after completing compression to drop it out.

20. A system according to claim 18, wherein said bottom plates (90a)(90b) and side plates (91a)(91d) are composed of inner wall plates (96) contacting with the dough and outer plates (97) surrounding said wall plates (96), between which plates (97) and plates (96) an air chamber (98) is formed, the outer plate (97) being connected to an air inlet pipe (99) communicating to the air chamber (98), and the wall plate (96) being composed of porous material.

21. A system according to claim 20, wherein the wall plate (96) is composed of porous metal.

* * * * *